United States Patent [19]

Thornburrow

[11] Patent Number: 4,875,523

[45] Date of Patent: Oct. 24, 1989

[54] PIPELINE SERVICING TOOL

[75] Inventor: Edward T. Thornburrow, West Yorkshire, England

[73] Assignee: Cameron Iron Works USA, Inc., Houston, Tex.

[21] Appl. No.: 256,454

[22] Filed: Oct. 12, 1988

[30] Foreign Application Priority Data

Dec. 24, 1987 [GB] United Kingdom ............... 8730103

[51] Int. Cl.⁴ ................. E21B 23/00; E21B 33/068
[52] U.S. Cl. ................................. 166/77; 166/80; 166/85; 166/277; 137/315; 138/97
[58] Field of Search ................. 166/377–379, 166/381, 386, 70, 72, 77, 77.5, 80, 55, 277; 137/15, 315; 175/85; 138/97; 254/29 R, 30, 106

[56] References Cited

U.S. PATENT DOCUMENTS

| | | | |
|---|---|---|---|
| 1,894,912 | 1/1933 | Otis | 166/77 |
| 1,895,132 | 1/1933 | Minor | 166/77 |
| 2,077,507 | 4/1937 | Yancey . | |
| 2,126,933 | 8/1938 | Stone et al. | 166/77 |
| 2,358,677 | 9/1944 | Yancey . | |
| 2,517,870 | 8/1950 | Gump | 166/85 |
| 3,795,570 | 3/1974 | Leutwyler | 166/77 |
| 3,999,610 | 12/1976 | Sage et al. | 166/77 |
| 4,162,704 | 7/1979 | Gunther | 166/77 |
| 4,460,039 | 7/1984 | Knight | 166/77 |
| 4,503,879 | 3/1985 | Lazarus | 137/315 |

OTHER PUBLICATIONS

FMC Sevice Tool Advertisement, 1978–1979 Composite Catalog, vol. 2, pp. 2595–2596.
Gray Tool Co. Completion Equipment Advertisement, 1982–1983 Composite Catalog, vol. 3, p. 3665.
Cameron Iron Works Tools Price Sheets, Model SC–43 (11–1947), Model SC–43.2 (11–1947) and Model SC–43.4 (1–1949).

Primary Examiner—Bruce M. Kisliuk

[57] ABSTRACT

The invention relates to a compact valve removal tool with a fixed crosshead (18) to be mounted on a pipeline end, such as a wellhead spool outlet (3), and a moving crosshead (19) which is axially slidable, the fixed crosshead accommodating an axially slidable and rotatable rod (16) and gripping means (50) for holding the rod, and the moving crosshead having drive means (23, 24) for advancing and retracting it to enable rod extension pieces (17) to be fitted or removed, the fixed crosshead also having safety stops (58) movable into the line behind the rod or behind a rod extension to block the path of the rod if the griping means failed. Preferably, the moving crosshead (10) cooperates with further safety means (60–72) to prevent operation of the gripping means except in predetermined, safe positions. The tool could be useful for operations other than plug insertion, such as milling a valve gate.

7 Claims, 7 Drawing Sheets

PIPELINE SERVICING TOOL

BACKGROUND

This invention relates to a tool for use in servicing a component in, or a section of, a pipeline such as a wellhead spool outlet. The invention is particularly, although not exclusively applicable to a tool the use of which enables the installation and removal of a plug in a wellhead spool outlet under pressure control, though it could be useful for other servicing operations in such a location. The tool is moreover particularly intended for enabling such servicing to be carried out in restricted access space situations.

In a wellhead spool outlet or other casing head, tubing head or christmas tree outlet on a wellhead, it is often necessary to replace or service a valve, e.g. a gate valve installed in-line. There may be two or three such valves (or other equipment) installed in series. In order to isolate that valve or that section of pipeline incorporating it, a screw-threaded bore will have been provided at the time of installation, located in a flange situated immediately upstream of the valve or pipe section; this bore is intended to receive a screw-threaded control plug which when screwed into place completely closes off the wellhead pressure from that section. This then enables the valve or other equipment to be serviced or replaced as required, quite safely because it is isolated from the wellhead pressure. The fitting of the screw-threaded plug into the tapped isolating flange bore and the removal of the plug afterwards is carried out by means of a special tool and it is such a tool with which the present invention is primarily concerned.

A known tool of this type comprises a yoke shaped body in which is slidably and rotatably mounted a polished rod, the forward end of which projects beyond a mounting flange of the body and has a socket head into which a corresponding square or hexagonal spigot of a control plug, which is to be fitted, can be inserted. The rod is surrounded by pressure-tight glands within the body and its other end extends into an elongate tubular casing fastened to the body, which casing can, in use, be pressurized by hydraulic or pneumatic pressure so as to apply an axial force on the rod to balance the operating pressure of the spool outlet. Indeed, in some cases the same pressure fluid is used, fed by a tapping from the wellhead spool outlet to the rod casing.

To use the tool, a valve in the spool outlet is closed, a blanking service flange is removed and the service tool (with a control plug securely held on the rod socket end) is bolted on by means of its end flange. The rod casing then has pressure fluid admitted to it to balance the wellhead spool pressure and when this balance is reached (as indicated by suitable gauges), the valve and any other valves in line are opened. Owing to the fact that the pressures on the rod are balanced, the rod may now be advanced by applying a suitable wrench against an exposed portion of the rod in the yoke-shaped part of the tool body, the rod being pushed forward so that the control plug carried at its front end is advanced through the open valve or valves until it reaches the tapped bore in the isolating flange whereupon the rod is rotated to screw the plug into place. After checking that the wellhead pressure is safely isolated from the spool outlet, the valve which requires servicing may safely be dismantled or repaired.

After completing the valve servicing, the plug installation procedure is reversed, inserting the rod until its socket end engages the plug, unscrewing the plug and withdrawing it through the open valves, the plug being carried on the end of the polished rod which is readily slidable in the tool body and casing under the balanced fluid pressure as explained above.

Wellhead spool outlet sections may be of considerable size, with several valves of 2 inch (51 mm) or more, in line, and in order to reach right along inside the spool section to insert a control plug it is obviously necessary to use a sufficiently long rod. In some cases, the rod itself may need to be over 3 feet (912 mm) long, and of course in its retracted position this means that the combined length of the tool body and its casing must also be about the same dimension in order to accommodate that rod length before the rod is inserted.

Where the wellhead surroundings are clear and access is unrestricted, this is no problem, and a suitably sized tool with a solid rod of the appropriate length can be used. However, there are situations where access space is restricted. These situations are likely to be found on production platforms with minimum well slot centers, or annulus valves on land installations within deep cellars. In such situation a different type of servicing tool is required which is compact, in which there is a relatively short rod which can be advanced by suitable drive means and to which may be added a number of similar relatively short rod extensions, the rod being advanced and held, in stages, whilst successive extensions are added.

A tool of the prior art included moving and fixed crossheads enabling rod extension pieces to be fitted for extending the rod in stages, to thereby avoid the need for a solid rod of sufficient length to reach right along the pipeline to the plug insertion bore. A valve removal tool with such a long solid rod could not be fitted in circumstances where space around the wellhead is restricted. Such earlier tool did not include any safety stop means or collet lock means.

SUMMARY

According to the present invention, there is provided a pipeline servicing tool comprising a fixed crosshead which can be mounted axially aligned on the end of a pipeline such as a wellhead spool outlet, the fixed crosshead accommodating an axially slidable and rotatable rod, gripping means in the fixed crosshead for holding the rod against axial movement, a movable crosshead connected to the fixed crosshead with fluid pressure operable drive means for advancing and retracting the moving crosshead in the axial direction of the rod, and one or more rod extension pieces, the rod and the extension or extensions being securely connectable end-to-end in exact axial alignment and so as to be secured for bodily longitudinal and rotational movement, there being further provided on the fixed crosshead, safety stop means movable into the line of the rod closely behind the rear end of the rod, or the rear end of a rod extension when connected to the rod, so as to block the rearward path of movement of the rod in event of failure of the gripping means to hold the rod or its extension.

Preferably, the safety stop means is biassed into its blocking position so that it automatically assumes that position unless held in a retracted position. Indicator means may be provided to give a visual indication that the stop means is in its blocking position.

Advantageously, the gripping means, which may comprise a collet device operable by a rotatable collar, is itself provided with safety catch means whereby the collet device can be operated to change its condition, i.e. to grip or to release the rod, or a rod extension, only when the moving crosshead is in certain predetermined positions, specifically two such positions, namely, when the moving crosshead is in its advanced position with the rear end of the rod or its extension located forward of the safety stop means; and when the moving crosshead is in its withdrawn position (but short of its limit) such that the gripping means when operated will engage the rod or an extension adjacent its rear end which is forward of the safety stop means.

In either of those positions, the operation of the gripping means can be safely monitored whilst the rod is under the control of the drive means of the moving crosshead so that there is no danger of the rod being blown out of control from the spool outlet by the wellhead pressure. In between those two positions of the moving crosshead when the gripping means is gripped onto the rod or onto a rod extension—i.e., when the drive means is being retracted in order that a new extension piece may be added, or during the tool removal procedure when the drive means is being advanced empty, having just removed an extension piece, in order to take-over the remaining rod or rod extension—the gripping means cannot be inadvertently operated because of the safety catch means, which prevents its operation. Moreover, even if the gripping means were to slip or fail during either of those crosshead movement steps, no danger would result because uncontrolled axial movement of the rod out of the spool outlet would be blocked by the safety stop means.

The safety catch means may comprise any suitable catch, detent or latch which prevents operation of the gripping means but in one embodiment where the gripping means is a collar operated collet, the catch mechanism may take the form of two interengageable toothed members one of which is connected to the collar and the other of which is non-rotatably mounted so that when they are engaged, the collar cannot be rotated either to release the collet or to cause it to grip.

Preferably, the safety catch is itself operated by position responsive means which cooperate with the moving crosshead or its drive means to determine the positions at which the safety catch means is released. The position responsive means may be constituted by any suitable device such as microswitches, but in a mechanical case may for example comprise one or more spring-loaded pins which in the predetermined positions, and only in those positions, can move into a respective recess when that recess has moved with the moving crosshead into the line of the pin. The movement of the pin or pins, indicating that the predetermined position has been reached, allows or causes, by means of an appropriate connection, disengagement of the safety catch.

Conveniently, the position responsive means also includes or is provided with a visual indicator to indicate that the tool is in one of its conditions when the gripping means can be operated.

The rod extensions have to be connectable very accurately and securely end-to-end for bodily longitudinal and rotary movement, and for this purpose each extension advantageously comprises an inner shank within a coaxial outer sleeve. The shank is screw-threaded at one end and has a head to receive a screw driver or other tool at the other. The sleeve on the other hand has a hexagonal spigot at one end and, at the other, a tapped section to receive the threaded portion of an adjacent extension piece and a hexagon socket to receive the hexagonal spigot of an adjacent extension piece. The shank and sleeve are relatively axially displaceable by a short amount to enable first the hexagonal spigot of the sleeve to be engaged with the socket of an adjacent rod or extension; then by axial movement of the shank, the screwed connection can be made to the corresponding other end of the sleeve of the adjacent rod or extension to hold the sections rigidly together. Other shapes than hexagonal could be used for the socket and spigot, such as a square or other polygonal shape.

Such a compact yet readily extendable tool, with its safety means, could be used for other service operations than control plug insertion.

BRIEF DESCRIPTION OF THE DRAWING

The invention may be put into practice in a number of ways but one specific embodiment will now be described by way of example with reference to the drawings, in which.

DESCRIPTION OF THE PREFERRED EMBODIMENT

Figure 1:
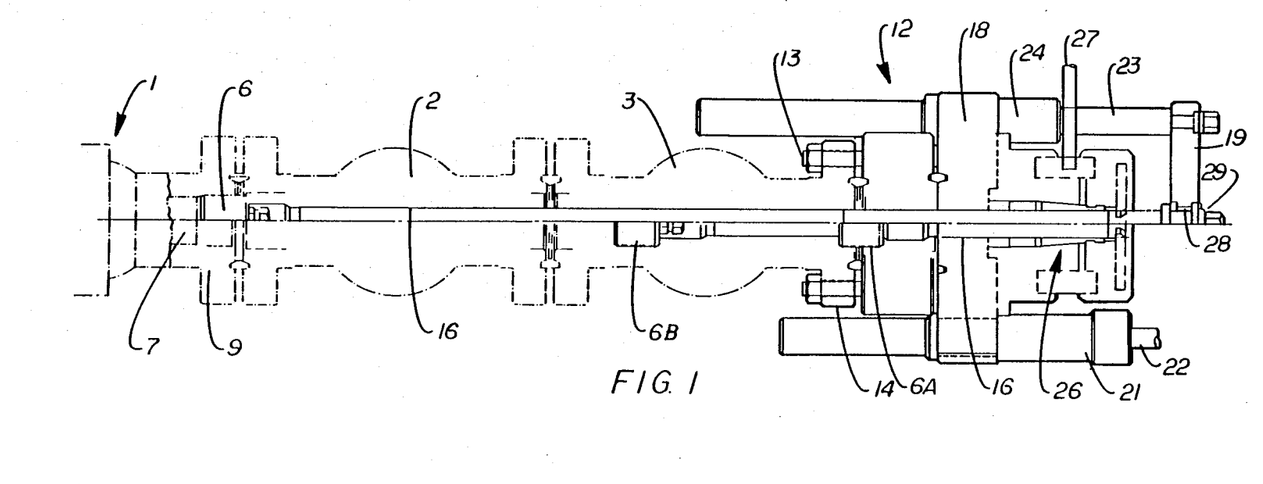
FIG. 1 is a general arrangement view showing in sketched outline a servicing tool in accordance with the invention when in use for installing a control plug in a wellhead spool outlet.

As shown in FIG. 1, a wellhead spool outlet 1 has connected to it two valves 2 and 3 in the series one or both of which are to be serviced which means that they have to be isolated from the wellhead pressure by fitting a screw-threaded control plug 6 into a specially provided correspondingly-tapped bore 7 in an isolating flange 9 at the spool outlet. FIG. 1 shows such a plug 6 being fitted using the servicing tool 12 which for this purpose is bolted by studs 13 to the end flange 14 of the outer valve 3. In the lower half of FIG. 1, the control plug 6 held on the forward end of a rod 16 of the servicing tool is shown in its initial position 6A before being advanced towards the spool outlet and also in one intermediate position 6B having passed through the first valve 3 and in the upper half of FIG. 1 the plug 6 is shown screwed into place in the tapped bore 7.

The servicing tool 12 is made up generally of a main, fixed crosshead 18 which is securely bolted to the valve flange 14 and a moving crosshead 19, each crosshead having a rectangular cross section with at diagonally opposite corners two hydraulic drive cylinder-and-piston jacks 21, 22 and at the other two diagonally opposite corners guide rods 23 fixed to the moving crosshead and slidable in sleeves 24 mounted in the main crosshead. The hydraulic jacks 21, 22 and the guide rods 23 and their sleeves 24 are aligned parallel to the axis of the rod 16 with the cylinders 21 supported by the main cross-head 18 and the pistons 22 connected to the moving crosshead 19.

The cylinder and pistons 21, 22 are sized to produce equal power in both directions with a required working pressure of one half of the pressure acting upon the polished rod 16.

Fitting closely in the main crosshead 18, the two guide units 23, 24 sustain the weight of the moving crosshead 19, and any load applied to it when turning the rod assembly, as will be explained. This ensures that the cylinder piston rods are not subjected to any bending moment.

The moving crosshead 19 transfers the piston force to the rod assembly 16 through a thrust bearing 28 on a hollow rod drive adaptor 29 which allows rotation of the rod assembly whilst under load.

When the jacks 21, 22 are operated, the moving crosshead 19 is thus moved forward or back over a predetermined stroke length and by this means the rod 16 is advanced towards the isolating flange 9 or withdrawn away from it. This must be done in stages because it would not be possible in many situations to use a solid rod of the required length which would need to be over 120 Cms long and require at least that amount of space again beyond the flange 14 of the outer valve in order to begin feeding the rod, whereas in some situations only 2 m or so is available between the spool centerline and the cellar wall.

Figure 2:
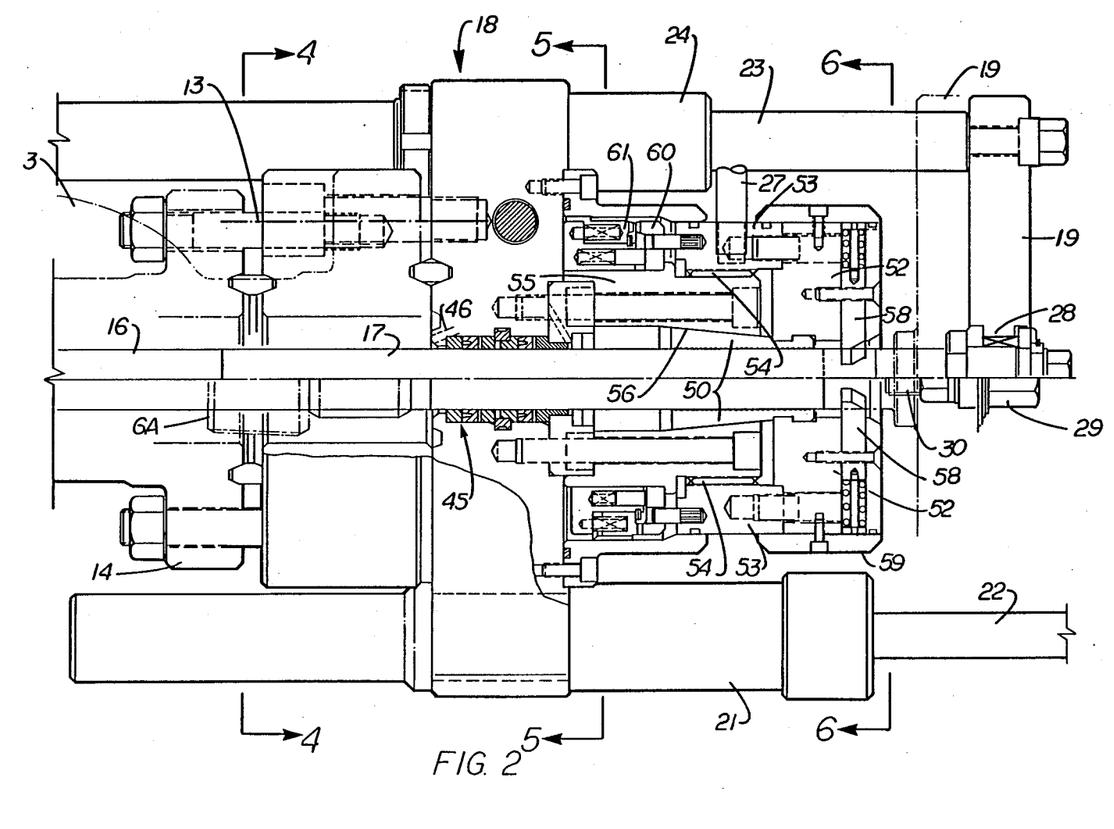
FIG. 2 is a detail view in axial section of the servicing tool.
Figure 3:
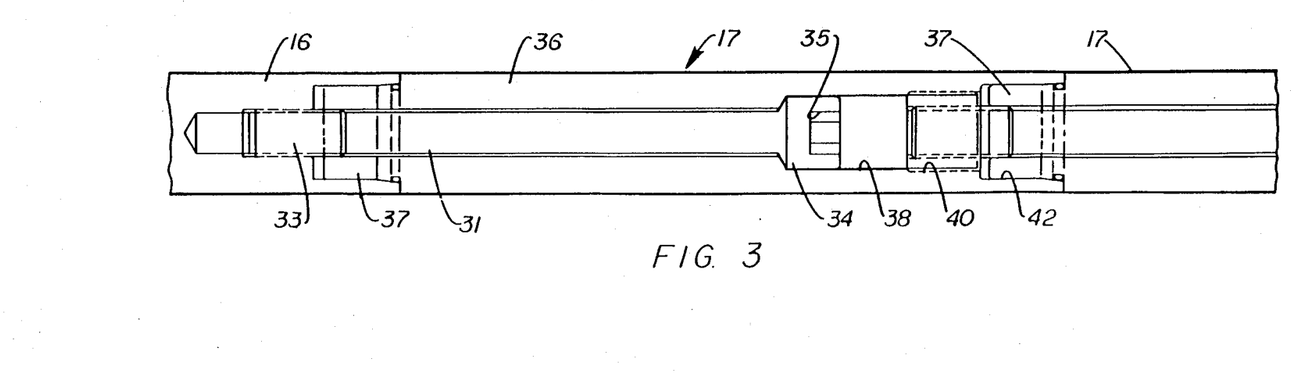
FIG. 3 shows in axial section a rod extension connected at each end to adjacent rod sections.
Figure 4:
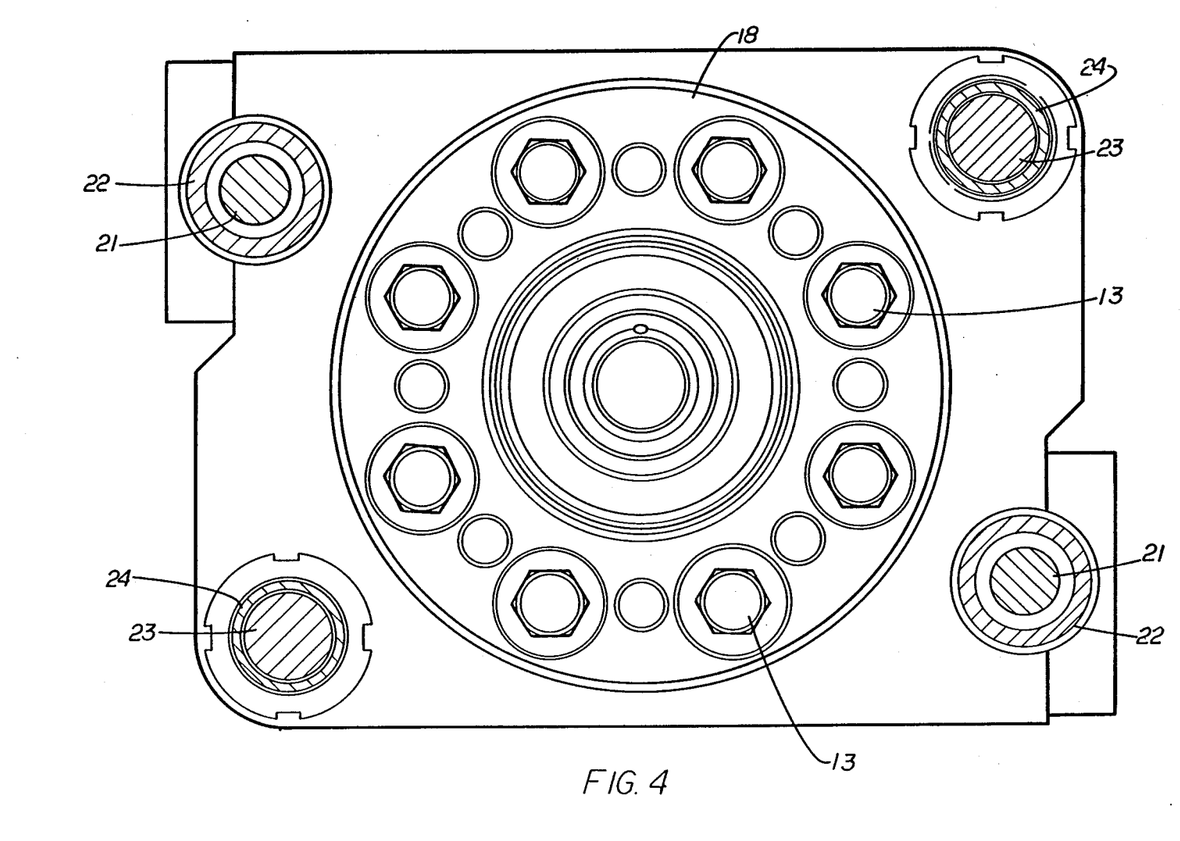
FIG. 4 is a cross-sectional view taken on the lines 4—4 of FIG. 2 showing the connection between the servicing tool and the end flange of the spool outlet.

The rod 16 therefore has extension pieces 17, such as that shown in FIG. 3, added to it one at a time, as it is advanced. For this purpose, within the main crosshead 18 there is a collet gripping mechanism 26, manually operated by a handle 27, which can grip the outside of the polished rod 16 to withstand any axial loading imposed on it by the wellhead whilst it is not held by the moving crosshead 19. When the rod is supported on the moving crosshead 19, the rear end of the rod is held by the rod drive adaptor 29 which has a hollow hexagonal spigot 30 (see FIG. 2) which fits into a socket end of the rod 16 or of a rod extension 17. Thus, the general procedure to advance the rod 16 is to move the rod forward by a forward stroke of the moving crosshead 18, the rear part of the rod 16 is then gripped with the collet mechanism 26, the moving crosshead 19 is retracted, a rod extension 17 is inserted and connected to the rear end of the rod 16, and the rod 16 and extension 17 is advanced, and those steps are repeated, adding successive rod extension pieces 18.

As shown in FIG. 3, each rod extension section 17 comprises an inner shank 31 having a screw thread 33 at its forward end and at the other end a head 34 with a hexagonal socket 35; and an outer sleeve 36, which has a hexagonal spigot 37 at its forward end and at its other end a counter-sunk bore 38 in which the shank head 34 is located with an externally and internally threaded bush 40 set in the bore 38 at a small distance from the shank head 34, and finally a hexagonal socket 42 at the near end of the sleeve 36 matched to receive a hexagonal spigot 37 of the next extension piece 17. To assemble an extension piece 17 to the rod 16 which has a corresponding rear end configuration, the shank 31 is moved axially inside the sleeve 36 (to the right as viewed in FIG. 3), and then the whole extension 17 is presented to the rod so that the sleeve spigot 37 is engaged in the socket 42 of the rod. Then, using a hexagonal key in the shank socket 34, the shank 31 is rotated to screw its forward end 33 into the bush 40 of the rod (or of the rod extension) to lock the assembly. In use, metal-to-metal and elastomer seals prevent escape of wellhead pressure along the assembly.

Referring to FIG. 2, the main crosshead 18 contains a double pressure seal arrangement 45, with vent and lubricant or injection ports 46, through which the rod 16 and its extensions 17 pass, the outside surface of the rod sections being polished to provide a good seal of the wellhead pressure.

To lock the polished rod whilst adding or removing extensions, the collet mechanism comprises, in more detail, a number of collets 50 axially located in a rotatable cap 52 which is connected by studs to a collar 53 having an internal screw-thread engaged on a thread 54 of a stationary collet body 55 attached fast to the main crosshead 18. Rotation of the collar 53 and cap 52 by the manually-operated handle 27 pulls the tapered collet 50 axially relative to a tapered bore 56 in the collet body 55, in which the collets 50 are located, to effect a wedging action tightening the collets 50 onto the rod 16.

It will be appreciated that, in use, pressure acting on the rod 16 from the wellhead will also tend to press the collets 50 axially and, through the wedging action, into even tighter grip on the rod 16. Nevertheless as an added safety measure, radially arranged stops 58 are provided in the cap 52 comprising two spring-loaded bars which move automatically into the axial path of the rod at a position closely behind the end of the rod 16 or of an extension 17 unless they are otherwise held apart by a rod extension 17. Thus, in the remote event that the collets 50 do not hold the rod 16 securely, any rearward movement of the rod (and any extensions) would be blocked by those stops 58.

Figure 6:
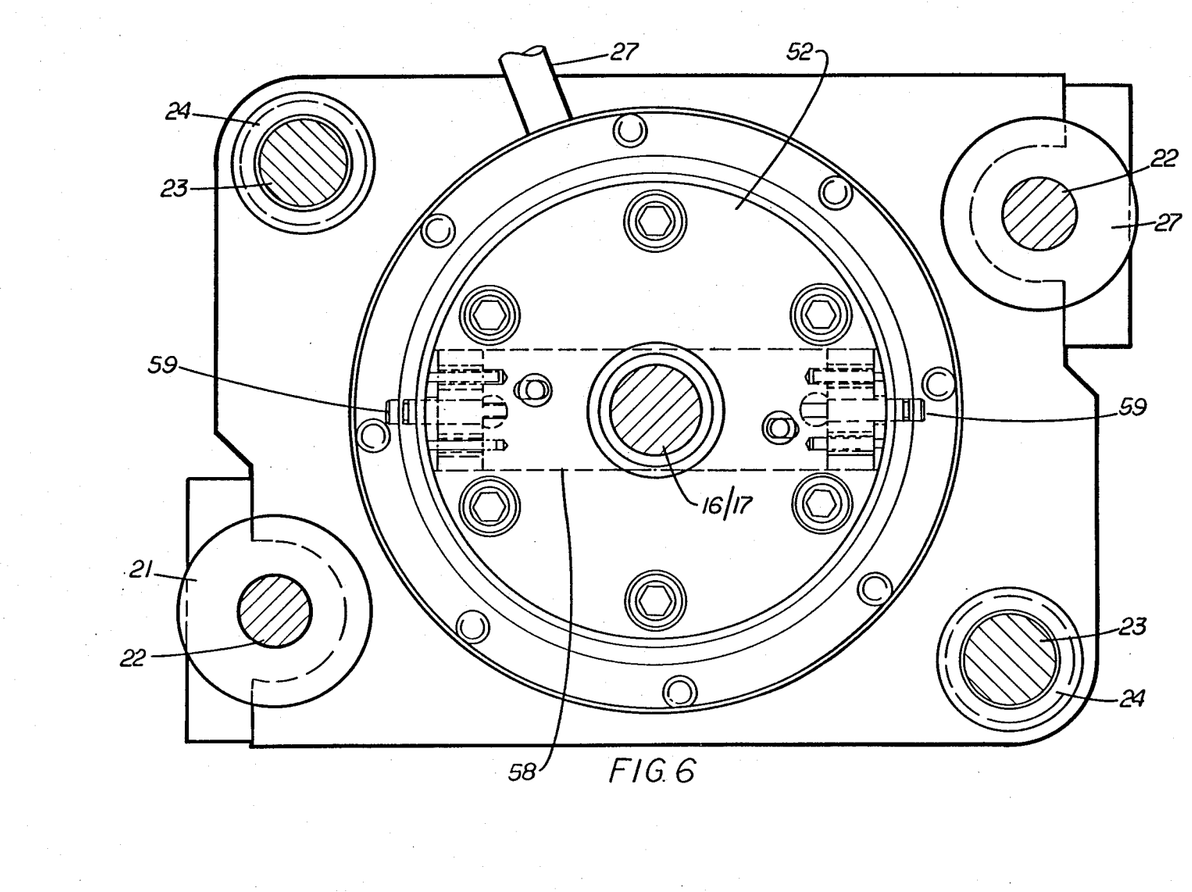
FIG. 6 is a cross-sectional view on the line 6—6 of FIG. 2 showing safety stop means behind a rod end.

As shown in FIG. 6 a visual indication of the position of the stops 58 is provided by pin extension 59 at the radially outer ends which in the non-operative condition project beyond the circumference of the cap 52 and which when the stops are operative will not be seen.

A further safety feature is provided for ensuring that the collet mechanism cannot be operated inadvertently except when it is safe to do so. This is shown in FIG. 2 and in FIGS. 5, 7 and 8. In order to prevent rotation of the collet operating collar 53, (FIG. 2) there is bolted to it one half 60 of a dog clutch device, the other half 61 of which is carried non-rotatably but axially slidably (by a short amount) on the collet body 55, springs urging it out of engagement with the other clutch member 60 to allow collet operation. When however the clutch member 61 is moved into engagement with the other clutch half (as can happen in any relative rotary position), the collet mechanism cannot be operated either to release it to make it grip.

Figure 5:
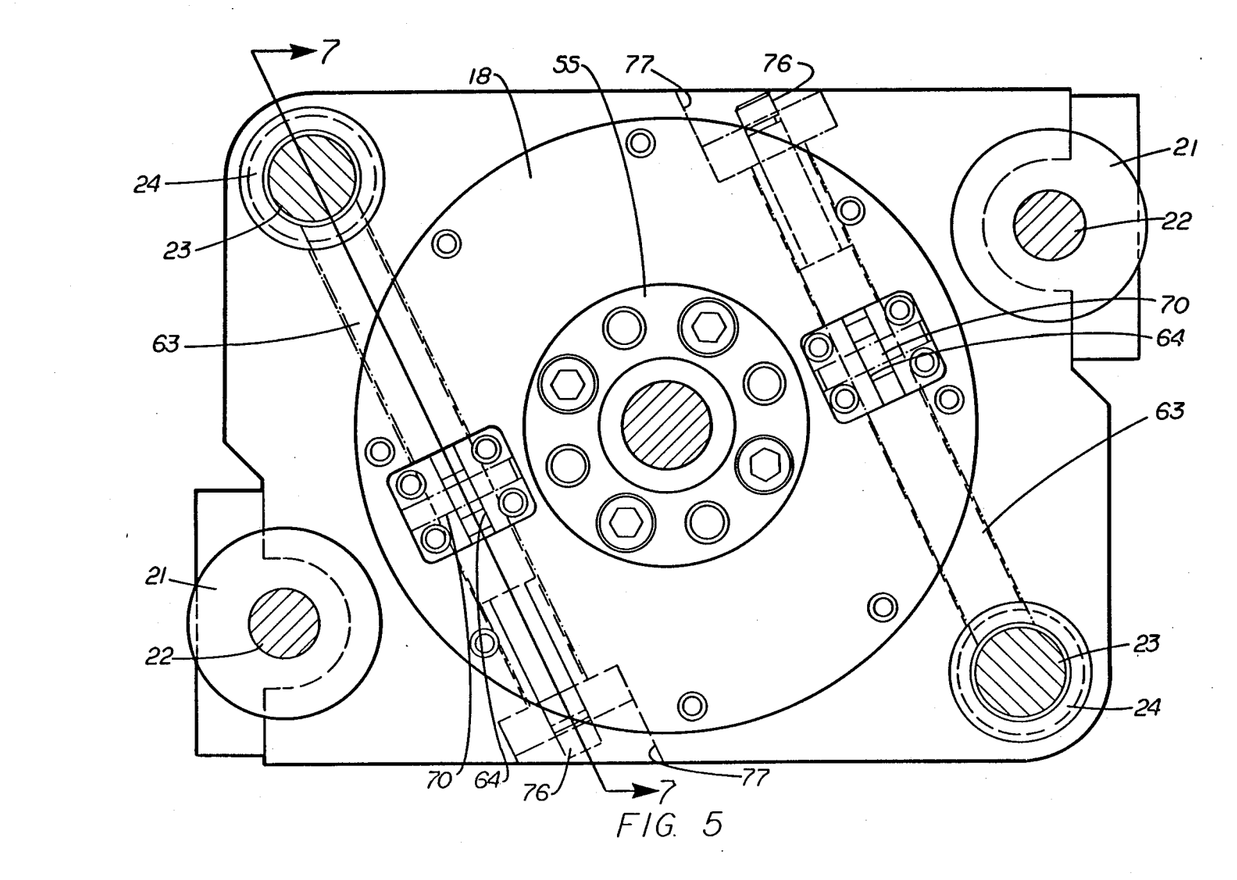
FIG. 5 is a cross-sectional view on the line 5—5 of FIG. 2 showing the position-responsive means of the tool which operates the safety catch to prevent or allow operation of the collet rod gripping means.
Figure 7:
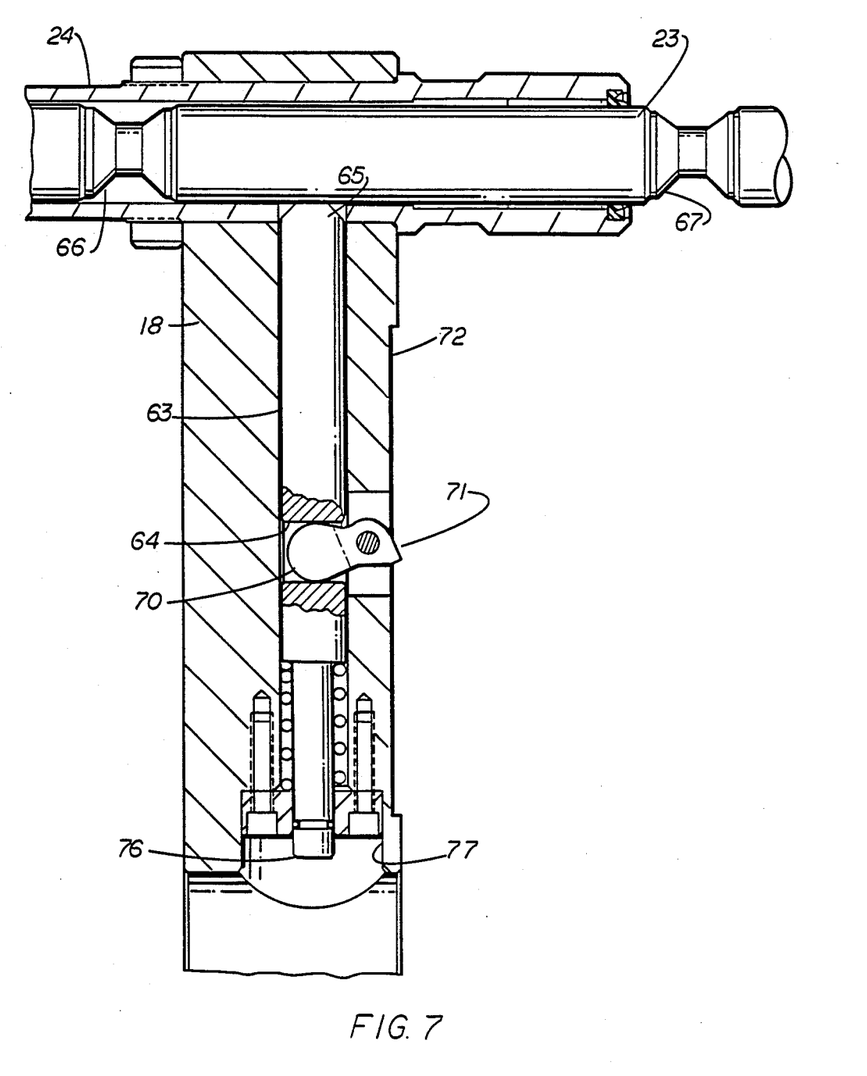
FIG. 7 is a section on the line 7—7 of FIG. 5 showing the position-responsive means between two predetermined positions.

The dog clutch 60, 61 is under the control of position sensors so that collet operation is permitted only when the moving crosshead 19 is in one of two predetermined positions. As shown in FIGS. 5 and 7, two spring-loaded pins 63 are mounted in the main crosshead 18 arranged generally tangentially to the collet body 55, their outer ends 65 being chamfered and bearing against a respective guide rod 23 at a point within its sleeve 24, and each guide rod 23 has two correspondingly shaped notches 66, 67 in set positions spaced apart by an axial distance equal to the length of a rod extension.

Furthermore, each pin 63 has, approximately halfway along its length, a transverse through slot 64 into which fits one rounded end of a pivoted latch lever 70 the other end 71 of which either projects beyond the rear face 72 of the main crosshead 18 by a small amount (FIG. 7) or lies wholly within the main crosshead 18 (FIG. 8) depending upon whether the respective guide pin 63 is in its inner position with the pin end 65 bearing against an un-notched part of the guide rod 23 or in its outer position with its head 65 engaged in a notch 66/67. The end 71 of the latch lever 70 is arranged to bear axially against the movable dog clutch member 61 to push it, against its spring bias, into engagement with the other dog clutch member 60.

Figure 8:
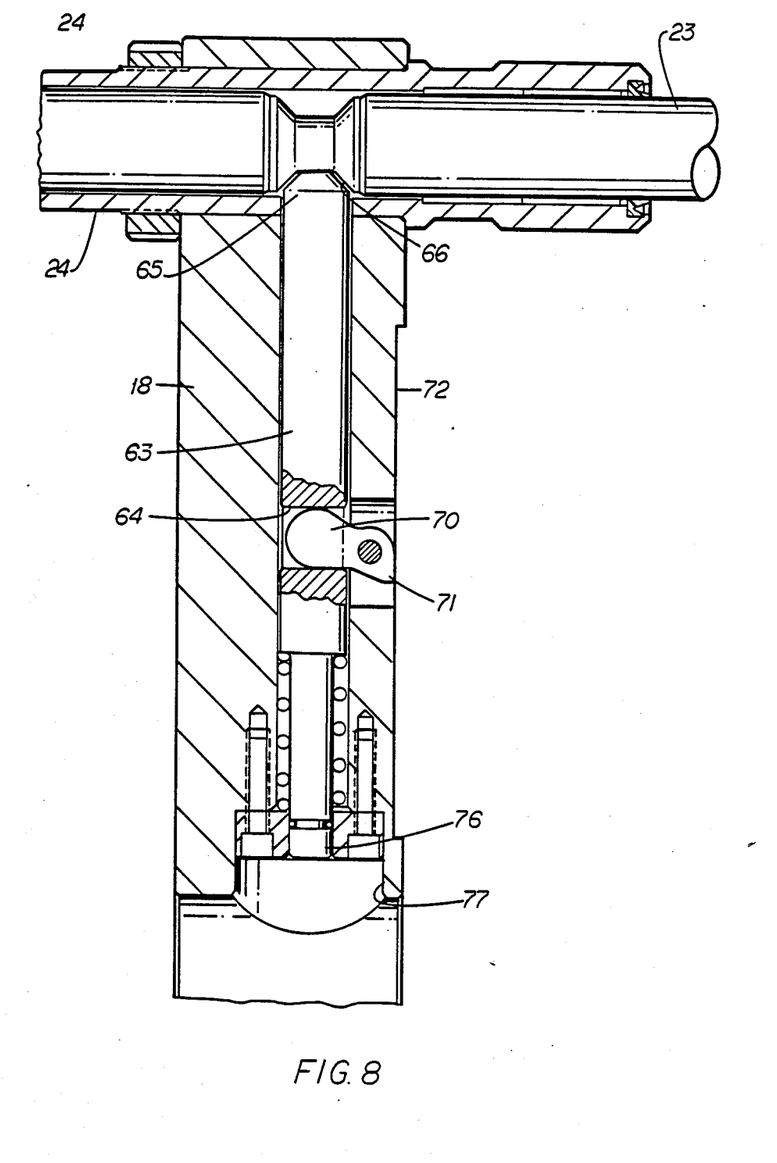
FIG. 8 is a view similar to FIG. 7 but showing the position-responsive means in one of the predetermined positions in which the collet may be operated.

Thus it will be appreciated that in all positions of the moving crosshead 19 when the pins 63 are not aligned with the notches 66, 67, the heads 71 of the latch levers 70 will project and press the dog clutch members 60, 61 together so that collet operation is prevented. Only in the two positions of the moving crosshead 19, one forward, the other almost (but not quite) fully retracted, will the guide pins 63 be engaged in one of the notches 66, 67 (as seen in FIG. 8) to retract the ends 71 of the latch levers 70 and allow the dog clutch members 60, 61 to become disengaged to permit collet operation. Moreover, the other ends 76 of the pins 63 (remote from the ends 65) will be visible projecting into recesses 77 in the main crosshead body 18 (see FIGS. 5, 7 and 8) when the pins 63 are not engaged in either of the guide rod recesses 66, 67, i.e., when the collets cannot be operated, providing yet another visual indication of the condition of the safety device.

The detailed operation of the tool to fit a control plug 6 is as follows. First a plug 6 of the correct size is inserted in the hexagonal socket at the forward end of the rod 16 and having closed one or both valves 2, 3, the main crosshead 18 with the guide units 23, 24 prior assembled, is bolted to the valve flange 14. An adaptor may be provided to enable connection of the crosshead to different sizes of flanges of different pressure rated equipment. The cylinder units 21, 22 and moving crosshead 19 are then assembled. Hydraulic lines are connected between the cylinders 21 and a pump (with pressure gauge and control valves), a two-speed manual pump being recommended for sensitive control of the rod 16. Then the drive adaptor 29 in the center of the moving crosshead 19 is engaged in the rod 16 and the pressures balanced between the wellhead and the cylinders so that the valves 2, 3 may be opened. The moving crosshead 19 is then pumped forward to full stroke until the notches 66, 67 come into line with the guide pins 63 causing the latch levers 70 to retract to disengage the dog clutch 60, 61 and allow collet operation by moving the handle 27 clockwise (FIG. 6) to tighten the collets onto the rod.

The pressure is then bled in the cylinders 21 and a visual check made that the collets have gripped the rod, after which the drive adaptor 29 is detached from the rod 16 and the moving crosshead 19 is pumped back. As the drive adaptor 29 moves away from the stops 58 they will move radially inwards automatically to block the axial path to rearward of the rod, thereby providing a fail safe in event of the collets 50 not gripping adequately. Moreover, as soon as the moving crosshead 19 begins moving back the guide pins 63 will be moved out of the notches 66, 67 and operate the latch levers 70 to prevent any movement of the collet operating collar 53 and its handle 27.

When the moving crosshead is fully retracted, a rod extension 17 can be inserted by hand between the drive adaptor 29 and the rod end, and the extension 17 is connected to the drive adaptor 29 by aligning its socket 42 with the drive hexagon spigot 30 of the adaptor. The extension 17 is supported adequately by this push-on connection without needing to be held further by hand. The moving crosshead 19 is then pumped forward a little to advance the extension 17 which is pressed between the stops 58 which are chamfered to cause them to spring apart, and the extension is brought up to the end of the rod where the internal bolt 31 is connected to the rod by rotating it by means of a wrench passed through the hollow bore of the drive adaptor 29. The moving crosshead 19 is now in a position where it can take up the pressure, and the notches 66 are aligned with the guide pins 63 to allow the collet mechanism to be operated to release the rod 16 and allow it and the added extension piece 17 to be advanced with a forward stoke of the moving crosshead.

It will be appreciated that the only time when the operator needs to have access between the moving crosshead 19 and the main crosshead 18 is when putting in a new extension 17. In this condition not only are the stops 58 safely in position behind the rod but the collet mechanism 26 cannot be inadvertently operated to release the rod 16 because with the moving crosshead 19 fully retracted, the recesses 66, 67 will be beyond the guide pins 63. All other advancing and connecting operations are done by or through the moving crosshead 19 from an entirely safe region.

These steps are repeated adding as many extensions 17 as necessary until the plug 6 reaches the bore 7 when the drive adaptor 29 is rotated using a wrench (whilst keeping forward pressure on the moving crosshead 19) to screw the plug 6 home into the isolating bore 7. The tool 12 may then be removed and whatever servicing operation is required carried out.

Thus, at all times when the rod 16 is not under the control of the moving crosshead 19, not only is it gripped by the collet mechanism but the stops 58 would prevent any substantial rearward movement and the safety catches prevent collet operation.

Removal of the plug 6 is essentially the reverse of this above procedure, the stops 58 and safety devices again acting to ensure adequate safety when the rod extensions are removed in turn. When the moving crosshead 19 is retracted to withdraw the rod, and the recesses 66 has become aligned with the pins 63 (before the moving crosshead 19 is fully retracted), the collet is operated to grip the rod or rod extension within the main crosshead. At this stage, the extension 17 is then secured to the drive adaptor 29 of the moving crosshead, by means of a capscrew passed through the hollow bore of the drive adaptor. This is to ensure that when the moving crosshead 19 is subsequently retracted further, it pulls the extension 17 off the rod 16 (or other extension). Without the use of a capscrew in this way, if the extension 17 separated from the drive adaptor 29 when the latter is retracted, the extension 17 would have to be pulled off the rod by hand, which might be hazardous.

When the moving crosshead is retracted further to its fully retracted position, as soon as the rod extension disconnects from the rod 16 (or other extension), the stops 58 will automatically move inwardly to their blocking position until pried apart again by the adaptor 29 as the moving crosshead 19 is brought forward to take over control of the next rod extension.

Again therefore, at no time does the operator have to have access by hand between the moving and main crossheads except when the stops 58 are in their safety position and the collet mechanism 26 is inoperable.

The tool is suitable for up to 10,000 psi (68 bars) pressures, but could be designed for even higher pressures, and can be assembled and operated by a single person, though assistance would be required to lift the main crosshead 18 up to the valve flange 14 on initial installation.

Variations are of course possible in the construction of the end stops behind the rod, and in the safety devices for preventing collet operation at any position other than the predetermined positions, any suitable alternative mechanisms being readily achievable. Also, the position-responsive means could be provided by microswitches or any other suitable means.

Whilst the tool has been described for control plug insertion and removal, the rod could of course be used as a drive rod for other purposes such as for milling a port in tubing inside a blow-out preventer, riser or spool under pressure control, or for milling through a valve gate.

I claim:

1. A pipeline servicing tool comprising:
   a fixed crosshead which can be mounted axially aligned on the end of a pipeline such as a wellhead spool outlet and having a bore therethrough,
   a rod positioned within said fixed crosshead bore and being axially slidable and rotatable therein,
   gripping means in the fixed crosshead for holding the rod against axial movement,
   a movable crosshead connected to the fixed crosshead with fluid pressure operable drive means for advancing and retracting the moving crosshead in the axial direction of the rod, and at least one or more rod extension piece,
   the rod and the extension being securely connectable end-to-end in axial alignment for longitudinal and rotational movement within said fixed crosshead bore,
   safety stop means on the fixed crosshead, movable into position closely behind the rear end of one of the rod, and the rod extension when connected to the rod, to block the rearward path of movement of the rod in event of failure of the gripping means to hold the rod or its extension.

2. A tool as claimed in claim 1, including
   means for biasing the safety stop means into its blocking position so that it automatically assumes that position unless held in a retracted position.

3. A tool as claimed in claim 1, including
   indicator means providing a visual indication when the stop means is in its blocking position.

4. A tool according to one of claim 1 wherein said gripping means includes
   a collet device operable by a rotatable collar.

5. A tool according to claim 4 wherein
   the gripping means includes safety catch means whereby the collet device can be operated to change its condition from one of gripping and releasing the rod, or a rod extension, only when the moving crosshead is in certain predetermined positions.

6. A tool as claimed in claim 5, wherein the safety catch means includes
   two interengagable toothed members one of which is connected to the gripping means operating arrangement and the other of which is non-rotatably mounted so that when they are engaged, the operating arrangement cannot be operated either to release the collet or to cause it to grip.

7. A tool according to claim 4, including
   position responsive means for operating said safety catch and which cooperate with one of the moving crosshead and its drive means to determine the positions at which the safety catch means is released.

* * * * *